Jan. 7, 1969  C. MICHELSON  3,420,606
CINEMATOGRAPHIC PROJECTOR APPARATUS
Filed Oct. 24, 1965
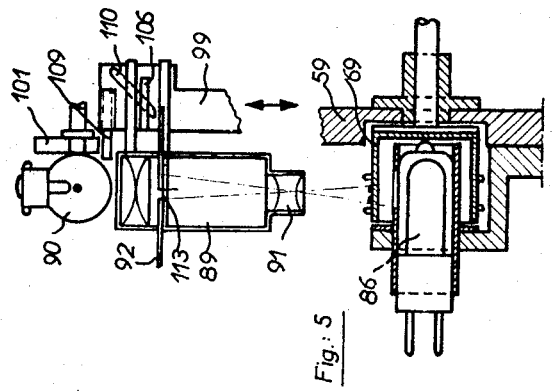
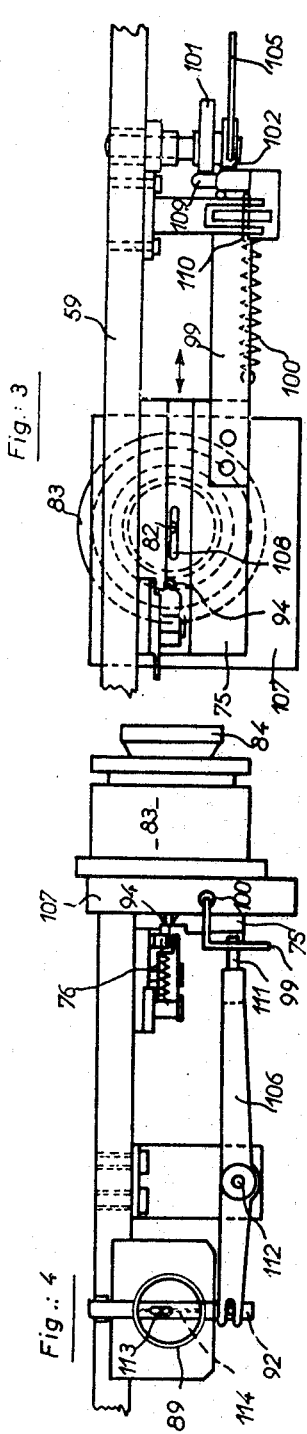
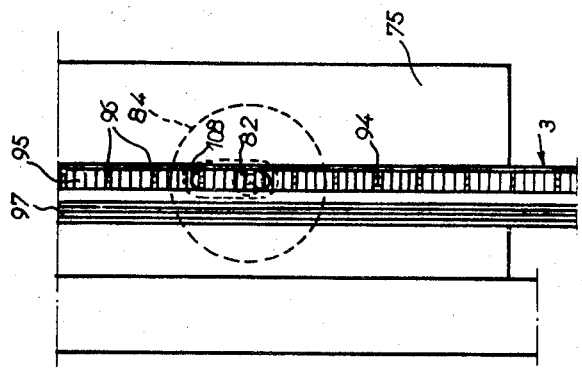
Inventor
Charles Michelson
By
Watson, Cole, Grindle & Watson
Attys.

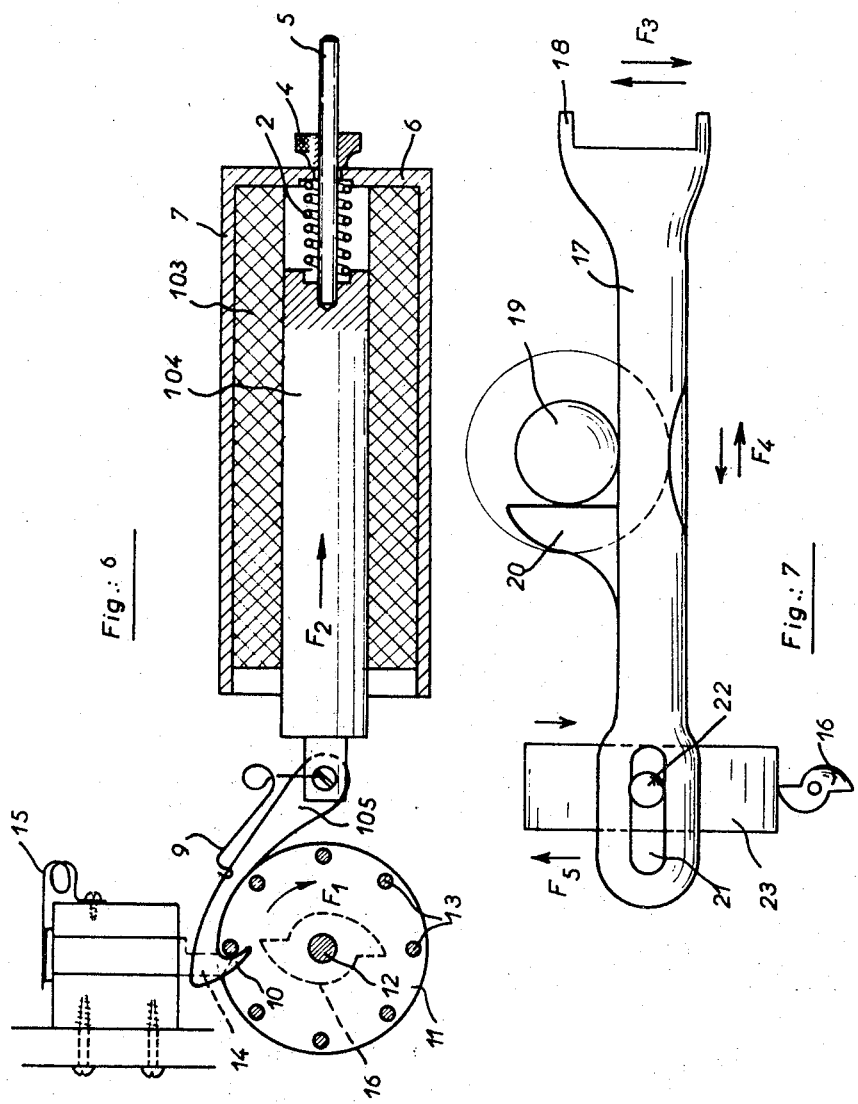

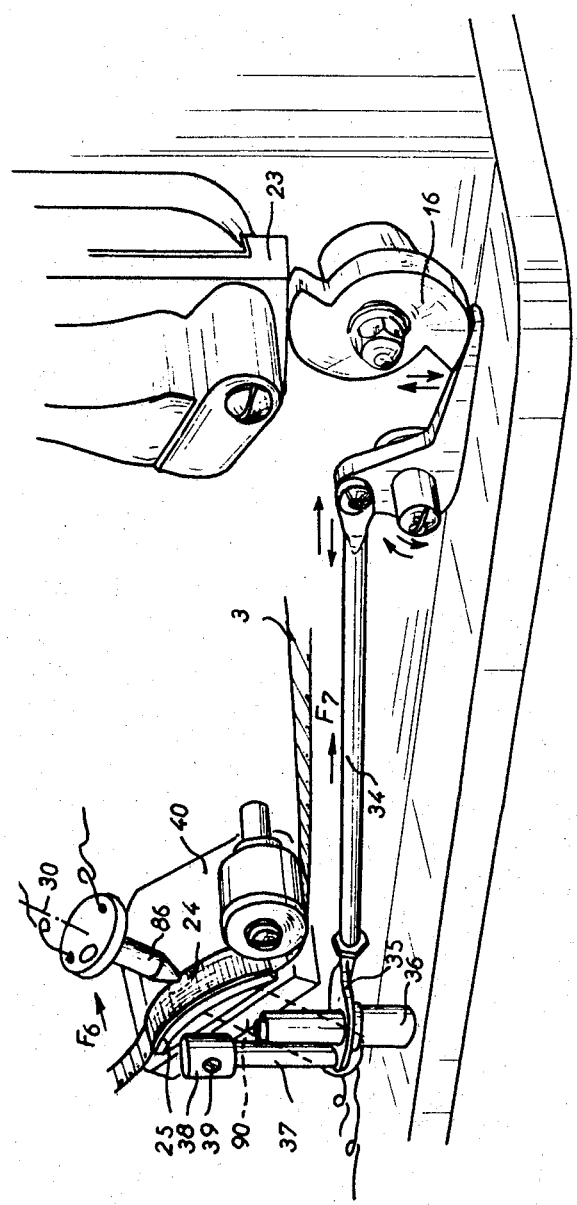

United States Patent Office 3,420,606
Patented Jan. 7, 1969

3,420,606
CINEMATOGRAPHIC PROJECTOR APPARATUS
Charles Michelson, Paris, France, assignor to Teverama S.A., Vaud, Switzerland, a company of France
Filed Oct. 24, 1965, Ser. No. 504,483
Claims priority, application France, Oct. 31, 1964, 993,467; July 15, 1965, 24,719
U.S. Cl. 352—239          4 Claims
Int. Cl. G03b 31/02

ABSTRACT OF THE DISCLOSURE

A movie projector for use with endless films bearing interdigitated images belonging to different sequences and as many juxtaposed sound tracks as there are such sequences. The projector comprises an image projection optical system adjustably related to said film and adapted to undergo relative shift with respect thereto equivalent to the height of an image, a sound pick-up system adjustably related to the film and adapted to undergo relative shift with respect thereto equivalent to the interval between consecutive sound tracks, and mechanical means for simultaneously adjusting said optical system and said pick-up system to produce said respective shifts thereof.

---

This invention relates to a motion picture projector specifically adapted for the use of endless films with sound tracks of the kind comprising, firstly, interleaving picture frames arranged in such manner that the frames belonging to one film sequence and designed to be projected in succession should not be contiguous but have an intervening space containing one or more frames belonging to one or several different sequences, and, secondly, juxtaposed sound tracks respectively associated to said frame sequences and on which the recorded sound signals relating to a given frame occupy a film length equal to the frame pitch or spacing between two consecutive frames of the same sequence. Such a multiple-sequence endless film with sound tracks was described in U.S. patent application Ser. No. 475,204, filed July 27, 1965, now abandoned, entitled, "Cinematographic Sound Film."

The utilization of such a film in a projector implies commutating the frame sequences and sound tracks at each complete revolution of the film and means for controlling these commutations at the point where the start of the film is bonded or welded to its end. The instant at which commutation must occur is identified on the film by a notch, a perforation, a metal coating, or by any other convenient local modification of the film adapted to effect the two commutations referred to, directly or indirectly.

The present invention relates more particularly to improvements to motion picture projectors for enabling these commutations to be effected automatically in a simple and reliable manner.

A projector according to the invention accordingly incorporates a mechanical device for simultaneously controlling the changes of frame sequences and sound tracks through the agency of a rotary cam rigidly connected to a ratchet wheel which is rotated intermittently by an electromagnet receiving an energizing pulse each time an appropriate feeler detects the transit of a marker on the endless film. This cam operates simultaneously on two drive channels terminating, respectively, at the frame projection system for producing a shift in projection equal to the height of a frame, and at the sound reading system for producing a shift in reading equal to the interval between two consecutive sound tracks.

In accordance with one of the improvements according to the invention, this simultaneous changeover is obtained by means of a dual rotary cam having oppositely symmetrical portions, with the frame shift being controlled by one of said portions and the sound track shift by the other portion and with each of these cam portions possibly extending over 180 degrees of arc.

The invention will now be more particularly described with reference to the accompanying drawings, in which:

FIGURE 1 shows a film strip with a sound track, for use with the subject projector of the invention;

FIGURES 3, 4 and 5 show an auxiliary picture and sound commutating device incorporated in the projector;

FIGURE 6 is a schematic fragmental sectional view of the intermittent cam driving electromechanical device;

FIGURE 7 is an exemplary illustration of means for operating a claw off said cam; and FIGURE 8 is a perspective view of the cam, its associated drives and a sound reading device.

Figure 2:
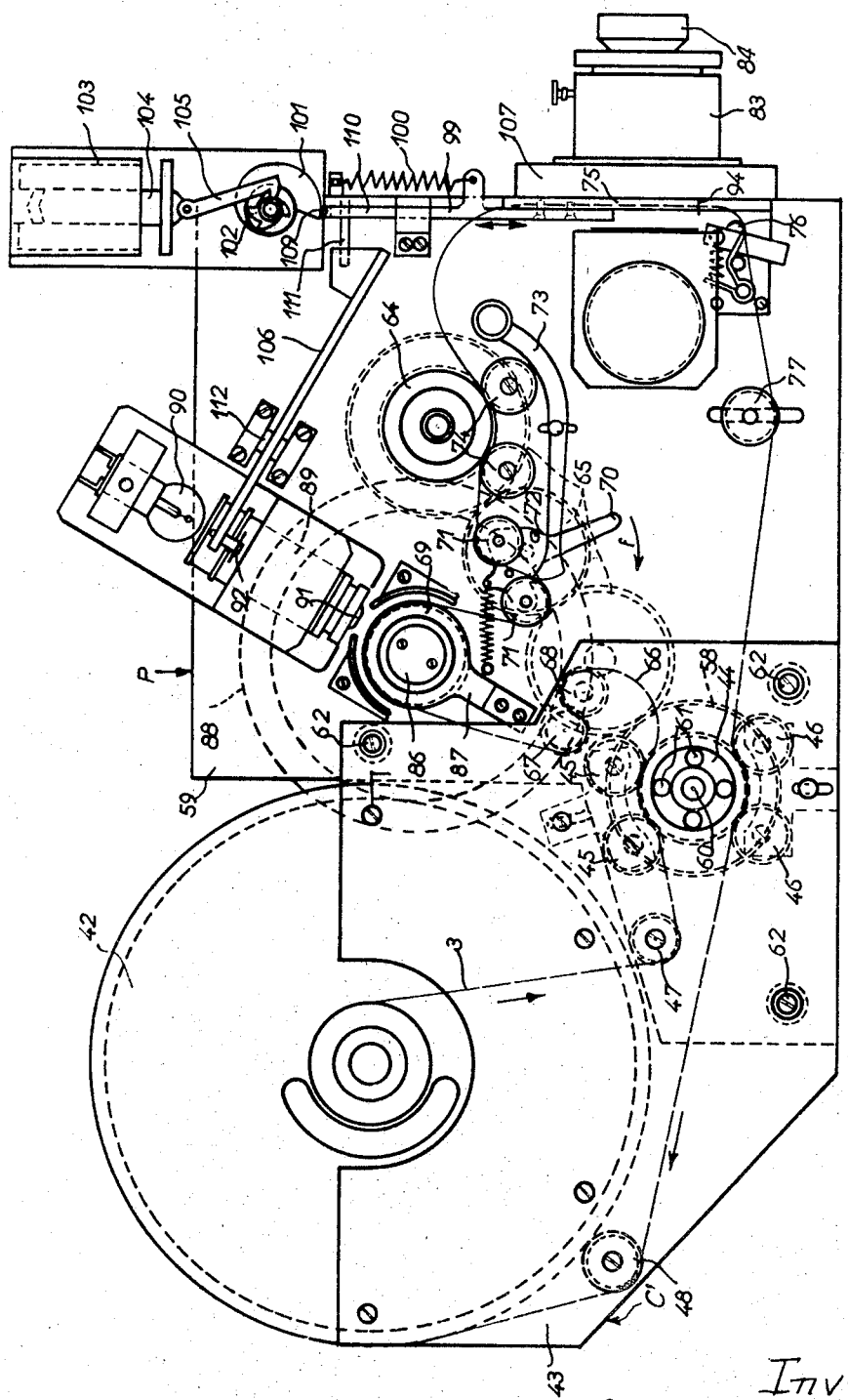
FIGURE 2 shows in side elevation a projector according to the invention with the endless film loading magazine in position.

For a clearer understanding of what follows, consideration will be given to a projector adapted to project a film containing four frame sequences, namely a film in which there are four frames belonging to four different film sequences between consecutive perforations, and consequently four corresponding sound tracks.

FIGURE 1 shows schematically by way of example an 8 mm. film 3 produced in this manner. Reference numeral 95 designates the row of frames comprising, between two successive perforations 96, four 1.9 x 2.5 mm. frames corresponding to four film sequences to be projected consecutively. Into one of these perforations, above, the projection aperture 82 (equal in size to a single frame and located in the optical axis of lens 83 (see FIGURE 2)), is engaged a counter claw to be described hereinafter. Along a lateral strip of the film four very narrow sound tracks 97 extend parallel with one another and correspond to the four frame sequences, respectively.

FIGURE 2 shows one possible form of embodiment of a loading magazine C comprising a flat, generally cylindrical magazine case 42 containing the spooled film 3 which emerges from the centre of the case and reenters through its periphery, as shown by the arrows. In this embodiment, the magazine case 42 is fixed to a mounting-plate 43 which also supports a sprocket drum 44 associated to film pay-off rollers 45—45 and film pull-in rollers 46—46. Auxiliary idler rollers 47 and 48 are positioned respectively ahead of drum 44 on the exiting run of film 3 and past drum 44 on the re-entering run.

Loading magazine C is fitted to the side of projector P, on a vertical mounting-plate 59 rigid with a horizontal support.

Protruding from this side of projector P is a motor shaft end equipped with a disc bearing an eccentric driving peg, or the like.

The magazine is positively located on projector P by engaging said motor shaft end and eccentric peg in a central hole 60 and in one of four eccentric holes 61, respectively, formed in sprocket drum 44. As a result, drum 44 is rigidly united with the motor shaft and can be positively rotated. At the same time, three holes 62 formed in the magazine mounting plate 43 lock onto as many braced legs of projector mounting-plate 59.

Behind mounting-plate 59 is mounted a sprocket drum 64 which, through a train of gears 65 made of fiber to ensure noiseless running, is rotated in the opposite direction to sprocket drum 44 by a gearwheel 58 keyed to the motor shaft.

The film 3 issuing from sprocket drum 44 of magazine C is wound, with a degree of slack at 66, onto a friction-type flattening roller 67 cooperating with a counter-roller 68, both of which are mounted on the magazine mounting-plate 43. The function of flattening roller 67 is to ensure constant film tension on a smooth sound-reading transparent drum 69 integrated into projector P, and to isolate said film, by means of the slack 66, from possible vibration caused by the cogs of drum 44.

A lever 70 moving in the direction of arrow F fetches two compensating rollers 71—71 into a position which facilitates loading the film. Simultaneously, a catch 72 on lever 70 lowers the end of a pivotal arm 73 which in turn lowers two counter-rollers 74 associated to sprocket drum 64. The film can then easily be threaded through the gaps and is pressed against a slidable passageway 75 bearing a counter claw 94. A film perforation then engages on counter claw 94, and a small beat mechanism 76 ensures intermittent film transport, perforation after perforation. The film 3 then runs over an auxiliary tensioning roller 77 and returns to drum 44.

The frames are projected by a lamp, the light from which passes through film 3, the aperture in lensholder 83 and lens 84.

The sound is read by a photoelectric cell 86 carried by a mount 87. Cell 86 is contained within transparent drum 69, onto the shaft of which is keyed a flywheel 88 positioned on the other side of the support. An optical tube having an aperture 89 is illuminated by a "sound" lamp 90. The image of the aperture is projected by lens 91 of optical tube 89 onto the surface of the film wrapped around drum 69. The light passes through the film sound track and the thickness of the transparent drum and activates cell 86. For reasons which will be set forth hereinafter, the optical tube aperture is not projected in its entirety. Only a portion thereof visible through a movable mask 92 is received by the lens, and the length of the image of this aperture portion is equal to the width of one of the film sound tracks.

An automatic mechanism permits of successively projecting all the frames of the first film sequence, to which corresponds one of the sound tracks. This is followed by the frames of the second sequence with their associated sound track, then the third, and finally the fourth. The endless film completes a full revolution for each sequence, so that four revolutions are required to exhaust all the frames on the film. The changeover from one sequence to the next is obtained by means of a passageway having an electric contact feeler which is fixed to the base of the projector and detects a lateral notch formed on the film to mark the beginning of each sequence.

A mechanism of this kind will now be more particularly described with reference once more to FIGURE 2, and also to FIGURES 3, 4 and 5.

It will be noted that FIGURE 2 includes a number of components which have not yet been described, to wit a sequence change control lever 99, a return spring 100, a four-position ratchet cam 101, a four-cog ratchet wheel 102, an electromagnet 103 having a core 104 and rod 105, and oblique lever 106 carrying the movable mask 92 referred to precedingly, and a fixed mounting-plate 107 for the lens-holder, formed with the projection aperture 82 and over which is vertically slidable the passageway 75 associated to counter-claw 94 (see also FIGURE 3).

Formed in passageway 75 is a long aperture 108 having a length greater than that of four frames 96 and which is slidable before the fixed projection aperture 82. Since movable passageway 75 is rigidly united with its counter-claw 94 and its beat lever 76, it will be manifest that the film, which is governed by counter-claw 94, will move with moving passageway 75 before the fixed aperture 82. Thus, all that is necessary is to shift the passageway 75 by one notch, i.e. the height of a single frame, to obtain the desired change of sequence. This change takes place each time the notch on the side of the film passes through the feeler contact-equipped passageway of the projector. Core 104 is then electrically attracted and its rod 105 causes ratchet wheel 102 and hence cam 101 to advance by one-quarter of a revolution. Cam 101 is a spiral cam providing a pitch of 1.9 mm. for one-quarter of a revolution, it being remembered that 1.9 mm. corresponds to the height of a frame. The theory of operation of the sequence changing mechanism will be readily understood in view of the fact that sliding passageway 75 is fixed to the straight vertical lever 99 which, via a catch 109 projecting at right angles, bears against the contour of cam 101 under the urge of return spring 100.

Clearly, this cam is specifically designed for the film format previously referred to, since the pitch of cam 101 and the number of cogs on ratchet wheel 102 will be governed by the film format.

The sound track changing mechanism is illustrated partly in FIGURES 2 and 3 and more fully in FIGURES 4 and 5.

Frame changing vertical lever 99 is formed at its upper end with a buttonhole or sloping ramp 110 with which a finger 111 of lever 106 slidingly cooperates. It will readily be appreciated that if lever 99 shifts vertically, then arm 106 will pivot slightly about its axis 112 and operate the mask 92. The aperture 113 in mask 92 will therefore slide along the aperture 114 of optical tube 89 and allow the light to pass through a certain portion of said aperture.

Alternatively, lever 106 could be operated directly by an auxiliary cam angularly rigid with the same shaft as cam 101.

As a result, the light beam issuing from this aperture and passing through the focal point of the lens of optical tube 89 will pivot about that point, and the reduced image of the portion 113 of the light aperture 114 will shift along a generating line of transparent reading drum 69 and consequently across the width of the film, thereby changing from one sound track to another.

The above arrangement is so devised that, for a shift of moving passageway 75 equal to the frame height of 1.9 millimeters, the shift sustained by the image of portion 113 of aperture 114 be equal to the width of a sound track plus the interval between successive sound tracks, namely 0.6 mm. plus 0.4 mm., or 1 mm.

Manifestly, the sound tracks will be illuminated correspondingly with the appropriate frame sequence.

On FIGURE 6, reference numeral 103 designates the electromagnet coil of which moving core 104 is spring-loaded by a spring 2, the core stroke being adjusted by an abutment nut 4 screwed onto a threaded rod 5 which is fixed to one end of core 104 and extends freely through the end-closure 6 of the soft-iron case 7 containing the electromagnet. The moving core has connected to it a link 105 which is spring loaded by a spring 9 and the hook-shaped free end 10 of which cooperates with a ratchet wheel or the like.

In one specific form of embodiment, the latter-mentioned ratchet wheel consists of two oppositely spaced discs 11 fixed to a common shaft 12. Extending between these two discs are eight pegs 13 regularly spaced angularly at 45 degrees from one another and providing as many ratchet wheel-like notches. The hook-shaped end 10 of link 105 engages between said two discs and exerts a pull on one of said pegs, thereby rotating ratchet wheel 11 in the direction of arrow F1 each time electromagnet 103 is energized and attracts its core in the direction of arrow F2. When the electromagnet is de-energized, spring 2 repulses core 104 in the opposite direction, and the hook 10, the end-face of which is ramp-shaped, rises as it slides over the next peg 13 it encounters, then, after the peg has moved past it, drops anew under its own weight and through the force exerted by spring 9, thereby reverting to the configuration illustrated, in readiness for a fresh rotation through a fraction of a revolution when the electromagnet receives the next energizing pulse responsively either to the feeler referred to precedingly, or to a push-button which closes a set of contact points in parallel with the feeler whereby to permit manual selection of the desired sequence.

Since the angular motions of ratchet wheel 11 must be effected with great precision, a wedge-ended slidable positioning pin 14 provides an abutment for the ratchet wheel pegs 13 after the ratchet wheel has rotated through one step. When a peg 13 passes beneath pin 14, the latter is raised, by virtue of its ramp-forming wedge-shaped end, against the countering action of a spring 15, and drops anew as soon as peg 13 has moved past it. Thus the ratchet wheel must be rotated through a little more than one-eighth of a revolution and return against abutment 14, thereby providing the required precision.

Fixedly mounted on shaft 12 of ratchet wheel 11 is a dual cam 16 having two oppositely symmetrical contours repeated every 180 degrees of arc. As will be seen in greater detail herein-below, this dual cam is effective in simultaneously activating the drive to the frame projecting system, by means of one of its cam contours, and the drive to the sound reading system, by means of the other contour.

The drive for the frame projecting system may be devised in any convenient manner.

The sets of frames corresponding to the consecutive film sequences (four in the specific example illustrated) may be illuminated simultaneously by a common lamp, selection of the frame to be projected on the screen being obtained by a simultaneous sliding of the pressure-plate and the lens. A corresponding single-frame aperture is cut out in the movable pressure-plate. The aperture in the fixed passageway permits simultaneous illumination of the frame being projected and of the intervening frames before the next one to be projected. A projection lamp of the type manufactured on a routine basis, with a single twisted filament, will enable the four contiguous frames to be illuminated provided it is placed horizontally.

Alternatively, only one frame at a time may be illuminated. The passageway and the pressure-plate remain stationary, with the sequence changeover being obtained by changing the position of the claws providing the intermittent frame travel. The advantage of this arrangement is that it increases the intensity of the light projected onto each frame and facilitates sequence changeovers. On the other hand, the projection lamp must have a point filament, and such lamps are not manufactured on a routine basis.

FIGURE 7 illustrates a common type of claw 17 the active end 18 of which goes through its well-known type of motion shown by the opposed arrows F3 and F4, responsively to the mutual action of an eccentric 19 and a return-motion catch 20. Whereas, in conventional arrangements, the pivotal motion of claw 17 in association with its buttonhole 21 is effected about a fixed axis, the position of the claw axis 22 of the present invention is made variable by an upward movement in the direction of arrow F5, and vice versa, responsively to a slide 23 riding on dual cam 16.

Thus, axis 22 remains stationary during a film run in which all the successive frames of the same sequence are projected. At the end of this cycle, cam 16 rotates through one-eighth of a revolution, and slide 23 bearing the pivot 22 about which claw 17 is oscillatably and slidably mounted moves vertically through a determinate height. This vertical movement modifies the position of the claws and hence the position of the frames with respect to the optical axis. This avoids displacing the pressure-plate and the lens, and only one frame of the film is illuminated at once, thereby increasing the brightness of the picture on the screen. In the specific example described for illustrative purposes, in which all the frames of the film will have been projected after the film has been cycled four times, the brightness may be multiplied fourfold.

Conversely, in the first alternative embodiment, four frames would be illuminated at the same time, but the mobile projection aperture would let through only the light rays corresponding to one frame.

As already indicated, dual cam 16 operates simultaneously, on the one hand on the frame sequence changeover control (through slide 23 for instance) and, on the other hand, on the sound track changeover control. In the form of embodiment shown in FIGURE 8, the latter control is effected through the agency of a linkage system 34 terminating at a plate 35 which is pivotally mounted about a fixed shaft 36 and carries an eccentric vertical rod 37 surmounted by an eccentric bush 38 the relative angular position of which is set by a screw 39.

When linkage system 34 moves in the direction of arrow F7 responsively to cam 16, bush 38 exerts pressure contact against a support 40 which is movable against countering spring means in the direction of arrow F6, at right angles to the direction of travel of film 33. Once screw 39 has been loosened, the eccentricity of bush 38 permits of adjusting the position of origin of sliding support 40.

On one side, support 40 carries a light source 90 furnishing a light beam concentrated into a thin line or very small circle the length (or diameter) of which is equal to the width of a sound track; on the other side, support 40 carries a photoelectric cell 86 devised to provide localized detection of said luminous line or circle. Source 90 and cell 86 obviously lie on the same axis 30 extending through an aperture 24 formed in a fixed film guide 25 level with the sound and optical tracks of the film.

It will clearly be seen that the control action of cam 16 results in a transverse shift F6 of support 40, and consequently of the assembly comprising source 90 and cell 86, the kinematic transmission system being so devised that rotation of cam 16 through one-eighth of a revolution causes the compound 49–90–86 to move through a distance equal to the spacing between two consecutive sound tracks. It goes without saying that with such an arrangement the illumination and detection functions will be performed under absolutely identical conditions for all the sound tracks.

What is claimed is:

1. A motion-picture unit for projecting endless films with sound tracks of the kind comprising interleaved motion-picture frames belonging to different film sequences and juxtaposed sound tracks respectively corresponding to said film sequences, said unit comprising a frame projecting system adapted to produce a projection shift equal to the height of a frame, a sound reading system adapted to produce a reading shift equal to the interval between two consecutive sound tracks, and incorporated means for simultaneously changing the frame sequence and the sound track, comprising a ratchet wheel, means for driving the same intermittently, a rotary cam rigid with said ratchet wheel, and two separate drives activated by said cam and operatively connected respectively to said frame projection system and said sound reading system whereby to produce said shifts, said rotary cam being a dual cam having oppositely symmetrical portions, the frame-shift drive being activated by one of the said portions and the sound track shifting drive being activated by the other portion.

2. A unit as claimed in claim 1, wherein each of said cam portions extends over approximately 180 degrees of arc.

3. A motion-picture unit for projecting endless films with sound tracks of the kind comprising interleaved motion-picture frames belonging to different film sequences and juxtaposed sound tracks respectively corresponding to said film sequences, said unit comprising a frame projecting system adapted to produce a projection shift equal to the height of a frame, a sound reading system adapted to produce a reading shift equal to the interval between two consecutive sound tracks, and incorporated means for simultaneously changing the frame sequence and the sound track, comprising a ratchet wheel, means for driving the same intermittently, a rotary cam rigid with said ratchet wheel, and two separate drives activated by said cam and operatively connected respectively to said frame projection system and said sound reading system whereby to produce said shifts, said ratchet wheel comprising a shaft, two mutually spaced facing discs fixedly mounted thereon, and uniformly spaced pegs interposed between said discs whereby to form as many ratchet wheel-like notches.

4. A unit as claimed in claim 3, wherein the means for driving said ratchet wheel intermittently comprise a link having a hook-shaped end cooperating with said ratchet wheel pegs, and electromagnetic means for intermittently actuating said link.

References Cited

UNITED STATES PATENTS

| | | | |
|---|---|---|---|
| 2,015,344 | 9/1935 | Kosken | 352—28 |
| 2,483,040 | 9/1949 | El-Mazzaoui | 352—239 |
| 2,590,956 | 4/1952 | Gille | 352—239 |

NORTON ANSHER, *Primary Examiner.*

W. A. SILVERTSON, *Assistant Examiner.*

U.S. Cl. X.R.

352—27, 37